United States Patent [19]

Cunningham et al.

[11] Patent Number: 4,620,084
[45] Date of Patent: Oct. 28, 1986

[54] AIRCRAFT THERMOSTAT

[75] Inventors: Charles R. Cunningham, Seattle; Glenn S. Godden, Woodenville, both of Wash.

[73] Assignee: General Electric Company, Cincinnati, Ohio

[21] Appl. No.: 566,095

[22] Filed: Dec. 27, 1983

[51] Int. Cl.$^4$ .............................................. H05B 1/02
[52] U.S. Cl. .................................. 219/497; 219/501; 219/508; 219/203
[58] Field of Search ............... 219/494, 497, 499, 501, 219/202, 508, 509; 244/134 D, 58, 129.3; 307/39–41

[56] References Cited

U.S. PATENT DOCUMENTS 3,675,046  7/1972  Harkenrider et al. .............. 219/499
4,329,568  5/1982  Rocher et al. ...................... 219/497

Primary Examiner—M. H. Paschall
Attorney, Agent, or Firm—Gregory A. Welte; Derek P. Lawrence

[57] ABSTRACT

The present invention relates to thermostats for aircraft water heaters. A temperature sensing circuit receives power through a supply circuit which includes a bridge rectifier and a ripple smoothing capacitor. When a predetermined temperature is reached there is an increase in power through the bridge rectifier. This increase triggers another switch which short circuits the input to the bridge and effects power supply to a heater coil.

6 Claims, 3 Drawing Figures

AIRCRAFT THERMOSTAT

The present invention relates to thermostats and, more particularly, to thermostats which are used in aircraft water heaters.

BACKGROUND OF THE INVENTION

Typically, the water heater used to provide a hot water supply in an aircraft employs an electromechanical temperature sensor in the form of a bimetallic element. The sensor, in being electromechanical, is adversely influenced by mechanical vibration present in the aircraft. In addition, certain types of these sensors exhibit an undesirable overshoot characteristic. For example, the following overshoot experiment was undertaken upon a heating system of Model No. 8921340G1, available from General Electric, located in Seattle, Wash. In the experiment, twenty hot water drafts of 4 oz. each were sequentially drawn from the system water supply. Following the 20 drafts, the water supply was found to be 11° F. higher than prior to the beginning of the experiment. Applicants believe that such overshoot is typical in the electromechanical aircraft heating systems.

OBJECTS OF THE INVENTION

It is an object of the present invention to provide a new and improved aircraft water heating system.

It is a further object of the present invention to provide a new and improved thermostat for use in aircraft water heating systems.

SUMMARY OF THE INVENTION

In one form of the present invention, a temperature sensing circuit receives power through a supply circuit which includes a diode bridge rectifier and a ripple-smoothing capacitor. When the temperature reaches a predetermined reference, a switch in the form of an SCR closes, causing an increase in the power drawn through the bridge. This increase triggers another switch, in the form of a Triac, which short-circuits the input of the bridge, thus reducing power passing through the bridge, and completes a circuit which feeds power to a heater coil. The heater coil heats a fluid to which the temperature sensing circuit responds.

DETAILED DESCRIPTION OF THE INVENTION

Figure 1:
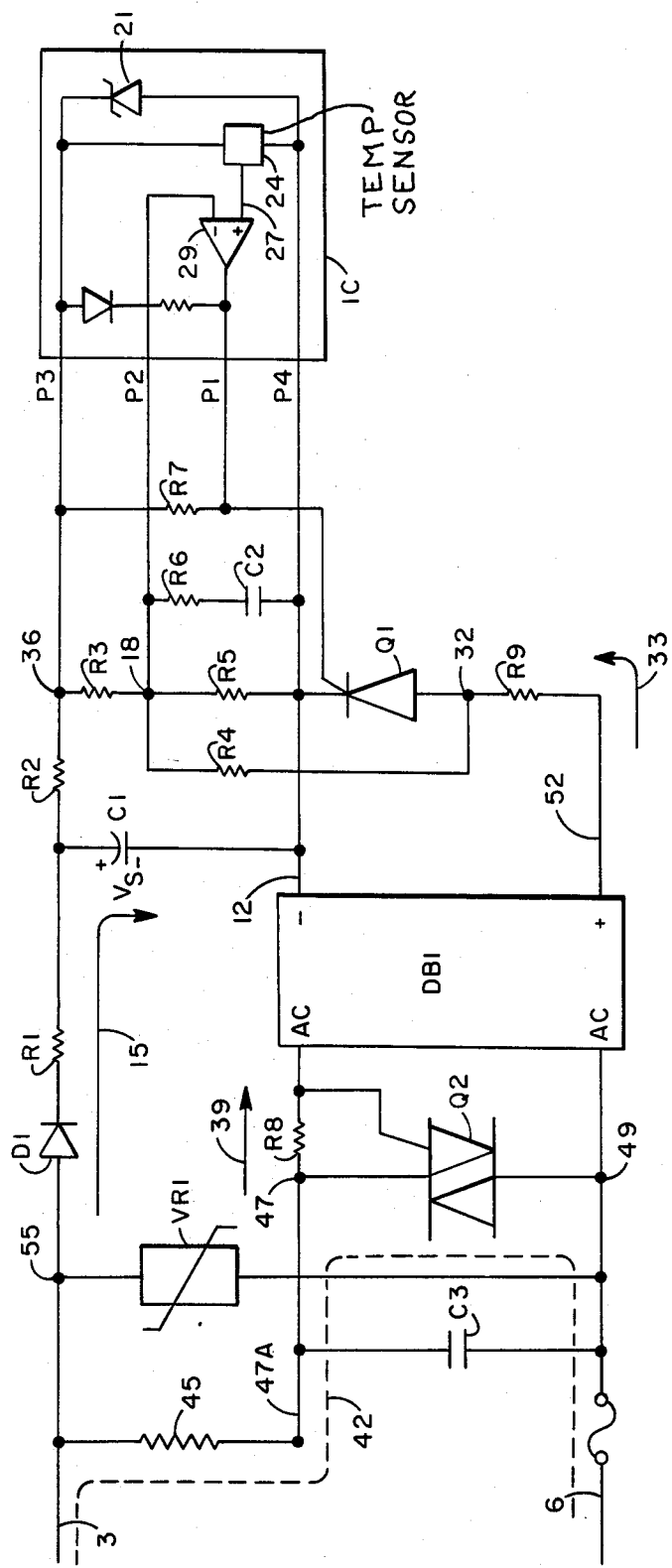
FIG. 1 illustrates electronic circuitry used in the present invention.

FIG. 1 illustrates a schematic diagram of the electronic circuitry utilized in one form of the present invention and, when read with the data provided in Table I, is considered to be fully descriptive of the structure of the circuit. The functioning of the circuit is as follows. Leads 3 and 6 are connected to an aircraft power system (not shown), which provides a 115 volt a.c. signal at 400 Hz. The signal, when fed through diode bridge DB1 to lead 12 establishes a voltage Vs across capacitor C1 by means of the current 15 flowing through diode D1 and resistor R1. Voltage Vs supplies operating power to an integrated circuit IC. As shown in Table I, IC is an integrated circuit No. LM3911 and a schematic of the internal components of IC is shown in FIG. 1. Resistors R3 and R5 function as a voltage divider to provide a reference voltage at node 18 which is applied to pin $P_2$ of IC. Zener diode 21, contained within IC, limits the voltage differential which can exist between pins $P_3$ and pins $P_4$, thus providing a precision voltage reference which is divided by resistors R3 and R5.

TABLE I

| | | | |
|---|---|---|---|
| R1 | 3.3 Kohm | ½ Watt | 5% |
| R2 | 82K | ¼ Watt | 5% |
| R3 | 24.3K | 1/10 W | 0.1% |
| R4 | 5.1 Meg | ¼ W | 5% |
| R5 | 28.0K | 1/10 W | 0.1% |
| R6 | 1.5 M | 1/10 W | 0.1% |
| R7 | 68K | ¼ W | 5% |
| R8 | 27 | ¼ W | 5% |
| R9 | 100 | ½ W | 5% |
| C1 | .068 MFD | 400 VDC | |
| C2 | .047 MFD | 50 VDC | |
| C3 | .0033 MFD | 500 VDC | |
| VR1 | Varistor, General Electric No. V130LA10A | | |
| D1 | Si Diode, 1A, 600 PIV | | |
| Q1 | SCR, 0.8A, 400 PIV | | |
| Q2 | Triac 15A 600 PIV | | |
| IC | Temp. Controller, Nat'l Semiconductor No. LM3911H | | |

A temperature sensor 24 within the IC responds to the temperature of the IC case itself (not specifically shown) and produces a voltage (termed a temperature voltage) on lead 27 which is substantially proportional to the temperature of the case. A comparator 29 compares the temperature voltage with the reference voltage on pin $P_2$ and, when the former reaches the latter, comparator 29 pulls pin $P_1$ to a logic low state, thus triggering silicon controlled rectifier (SCR) Q1 into conduction. (In the absence of this action of comparator 29, resistor R7, connected to pin $P_1$, acts as a pull-up resistor to pull SCR Q1 into a nonconducting state.)

When SCR Q1 is triggered, a short circuit is effectively provided between lead 12 and node 32 such that a current 33 flows through resistor R9. Also, resistor R4 is placed in parallel with the resistor R5, thus changing the effective value of the resistance between nodes 18 and 32. This alters the voltage divider network formerly composed of resistors R3 and R5, thus forcing the potential of node 18 closer to that of node 36, since resistor R4 has a much larger value than resistor R5 as shown in Table I. This change in the reference voltage introduces hysteresis to the circuit because now comparator 29 will remain triggered until the temperature sensor 24 produces a temperature voltage which is lower than the voltage at which the sensor was triggered. In the embodiment described in FIG. 1 in Table I, this hysteresis is approximately 3° F.

Upon triggering of SCR Q1, a current 39 flows through resistor R8, thus triggering Triac Q2 through gate 39A. This triggering has a two-fold effect. First, it completes the circuit shown by dashed line 42, thus applying power to heater coil 45 which imparts heat to a water tank 46 in FIG. 2. Second, triggering of Triac Q2 effectively imposes a short circuit between nodes 47 and 49, thus resulting in a substantially zero potential being applied to nodes 12 and 52, thus detriggering SCR Q1, thereby reducing power drawn through diode bridge DB1. Therefore, a saving in power is attained, with a resultant attainment in a reduction in the heat generated by the components which would have used this power. The importance of this reduction in power consumption will be later described when the packaging of the circuit is discussed. Capacitor C3 and varistor VR1 inhibit triggering of Triac Q2 and SCR Q1 by spurious noise. In particular, varistor VR1 serves to limit the potential between nodes 49 and 55 to 130 volts RMS, thus preventing noise spikes from reaching Triac Q2. Resistor R6 and capacitor C2 function to filter out high frequency noise and inhibit its arrival at pins $P_2$ and $P_4$.

Figure 2:
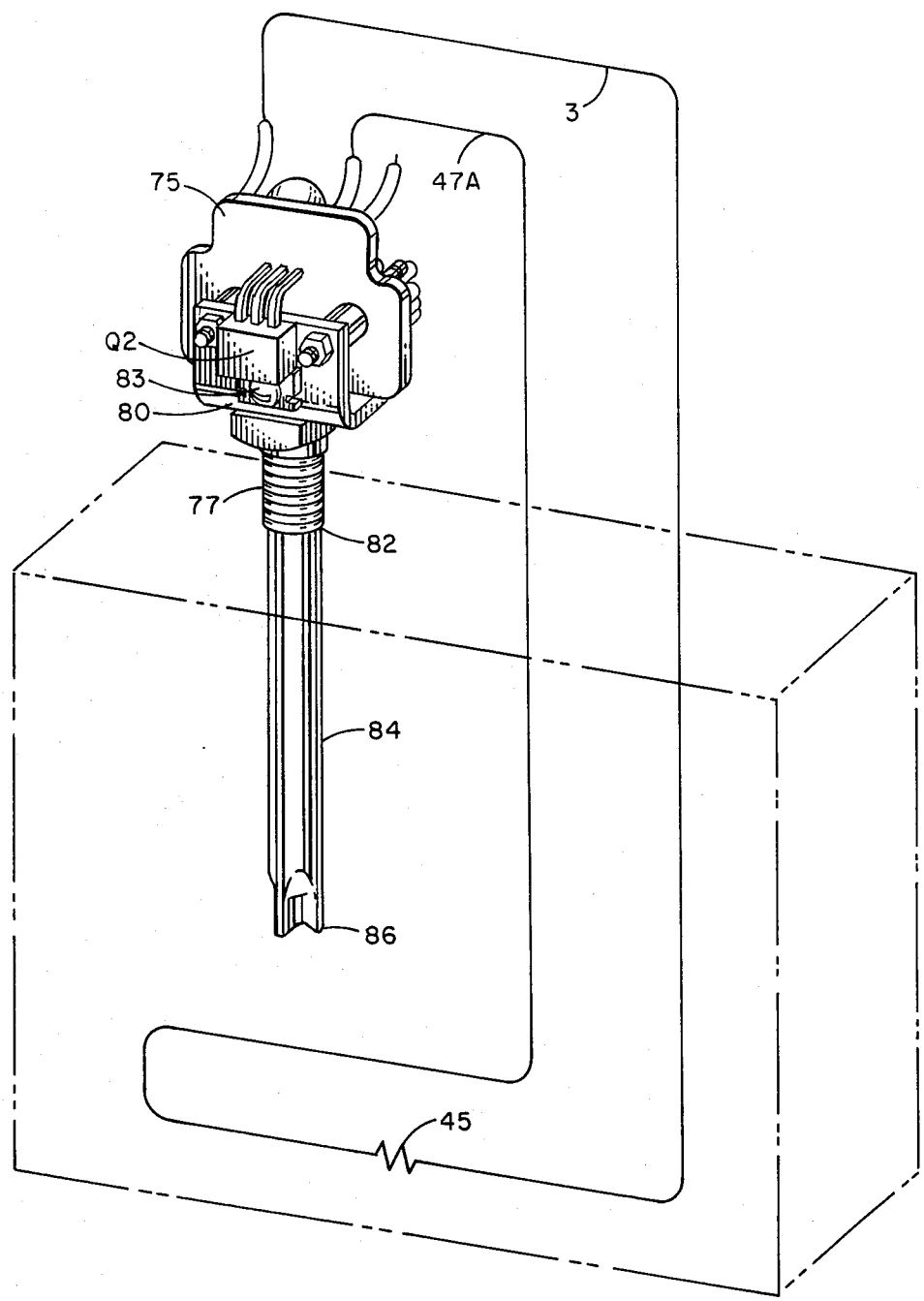
FIGS. 2 and 3 illustrate two views of the present invention.
Figure 3:
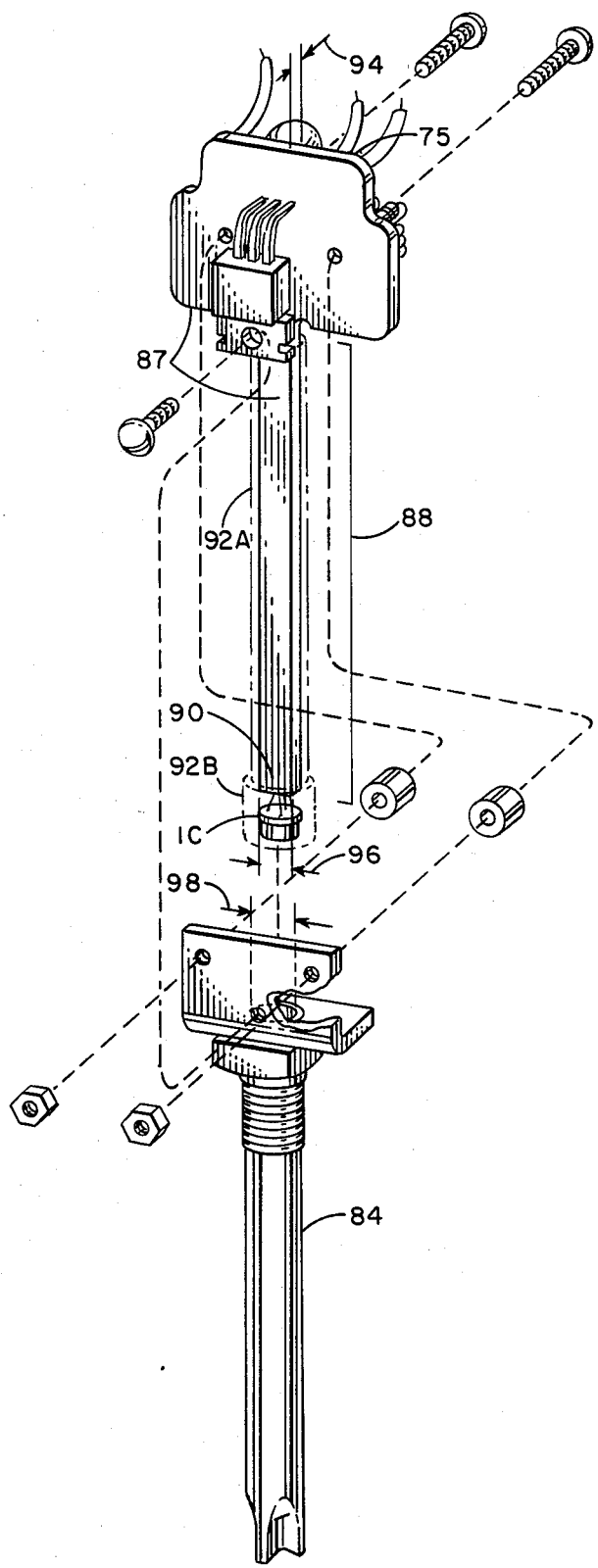

Attention will now be turned to packaging the circuit of FIG. 1. FIG. 2 illustrates upper part 75 of a substrate in the form of a printed circuit board supporting some of the components of FIG. 1. Some of the components are numbered according to FIG. 1. A threaded stud 77 supports an angled bracket 80 to which Triac Q2 is fastened by screw 83. Attached to the bottom 82 of threaded stud 77 is a stainless steel tube 84 having an end 86 which is crimped and welded closed. The entire circuit board 87 has the shape shown in FIG. 3 which includes an elongated probe portion 88 in addition to the upper part 75. The probe portion 88 supports at its end 90 the IC of FIG. 1.

The probe portion 88 and the IC are surrounded by a cylinder of heat-shrink tubing 92A. The IC is surrounded by a second cylinder of heat shrink tubing 92B. The heat shrink tubings 92A and B are then shrunk by application of heat after which the probe portion 88 is inserted into the stainless steel tube 84. The dimensions of the apparatus are such that a positive friction fit is achieved between the heat shrink tubes and the tube 84. In one embodiment, the thickness of the board (dimension 94) was 0.07 inches and the width of the probe portion 88 (dimension 96) was 1.5 inches. The diameters of heat shrink tubing 92A and 92B prior to shrinking were 3/16 and ¼ inches respectively. Respective wall thicknesses were 0.007 and 0.012 inches.

The upper part 75 of the circuit board 87 is fastened to the angled bracket 80 by bolts 101 and spaced from the angled bracket 80 by nylon bushings 104. The bushings 104 serve to align the probe portion 88 with the axis of the tube 84. The bolts 101 are equidistant from the axis of the tube 84 for purposes of vibration damping.

One important aspect of the present invention lies in the use of the heat shrink tubings 92A and B (which are resilient) to dampen out vibrations within the stainless steel tube 84 to therefore increase the fundamental resonant frequency of the probe portion 84. Further, the 2-point mounting provided by bolts 101 together with the points of contact between the heat shrink tubings 92A and B and stainless steel tube 84 provide a 3-point mounting system which has been found to increase the fundamental resonant frequency of the entire thermostat system to thereby inhibit damage inflicted by vibration imparted to the thermostat system by the aircraft.

Another important aspect of the present invention lies in the heat flowpaths provided. A heat flowpath carries heat produced by Triac Q2 (about 4–6 watts) along the angled bracket 80 (which is preferably copper), along the threaded stud 77, and thence to two heat sinks. The first heat sink comprises the tank wall (not shown) to which the threaded stud 77 is fastened. The second is the water in which the tube 84 is immersed.

In the event that there is no water in contact with the tube 84, as when the aircraft is parked during storage, and if the heating system is left energized by the application of the 120 volt signal to leads 3 and 6 in FIG. 1, the following safety feature is provided by the present invention. The heater coil 45 in FIGS. 1 and 2 draws about 420 watts of power. The heater element is contained in the same tank 46 as tube 84 in FIG. 2, which is a ½-gallon insulated water tank, and the heater element 45 is located approximately one inch from the tube 84. In the absence of water in the tank, the IC in FIG. 1 will at first sense a temperature below that indicated by the reference voltage at node 18 and will thus cause SCR Q2 to be triggered, thus turning on heater 45.

The heater 45 tends to heat the IC by radiation and convection, thus raising the temperature of the IC. When the temperature of the reference voltage at node 18 is reached, the heater is turned off by comparator 29. In addition, the heat flowpath between Triac Q2 and the IC (located near the bottom of the tube 84 in FIG. 2) tends to heat the IC, thus further increasing the temperature of the IC and bringing the voltage of lead 27 closer to the reference voltage.

In anoter embodiment of the present invention, a 270 microHenry inductor is connected in series with lead 6 in FIG. 1 in order to suppress the conduction of electromagnetic interference from the present invention to other components of the aircraft. Applicants note that the heat sinking characteristics provided by angled bracket 80 in FIG. 2 are indicated by the heat sink symbol 80A in FIG. 1.

Numerous substitutions and modifications can be undertaken without departing from the true spirit and scope of the present invention. What is desired to be secured by Letters Patent is the invention as defined in the following claims.

We claim:

1. A temperature controller, comprising:
   (a) a power supply circuit comprising a bridge rectifier (DB1) having two input leads;
   (b) a temperature sensing circuit (IC) which receives power from the rectifier and which produces a temperature signal in response to the temperature of a fluid;
   (c) means (R3, R5) for providing a reference signal;
   (d) switching means (Q1) for connecting and disconnecting at least one resistor (R4) to the recitifier in order to alter the current supplied by the rectifier;
   (e) comparator means (29) for comparing the temperature signal with the reference signal and for closing the switching means when the two signals attain a predetermined relationship, thereby increasing the current supplied by the rectifier; and
   (f) a Triac (Q2) which is coupled to the rectifier such that the Triac is triggered into conduction by the current increase of (e), thereby completing a circuit through a heater for heating the fluid and substantially shorting the input leads of the rectifier, thus opening the switching means thereby reducing the current supplied by the rectifier.

2. A hot water thermostat in an aircraft, comprising:
   (a) sensing means (24) for sensing the temperature of the water;
   (b) an elongated tube for supporting the sensing means in the water;
   (c) rectifying means (DB1) for rectifying an alternating current signal;
   (d) ripple reducing means (C1) for reducing the voltage ripple of the rectified signal of (c);
   (e) comparator means (29) for comparing the temperature signal with a reference and for activating a switch (Q1) when a predetermined relationship therebetween is attained; and
   (f) a Triac (Q2) coupled to the rectifying means of (c) such that when the switch of (e) is activated, the Triac delivers power to the heater (45) and opens the switch of (e).

3. A thermostat according to claim 2 and further comprising a resilient tubing surrounding the sensing means and located inside the elongated tube.

4. A thermostat according to claim 2 in which the switch of (e) comprises a silicon controlled rectifier.

5. A water heating system for use in an aircraft, comprising:
   (a) a circuit including:
   (i) two input nodes (47 and 49) for receiving an a.c. signal and presenting the signal to a diode bridge means (DB1) for rectifying the signal and presenting the rectified signal to two output nodes (12 and 52);
   (ii) a Triac connected between the input nodes (47 and 49) and having a gate (39A) connected to first input node (47) by a resistor (R8);
   (iii) capacitor means connected between the first output node (12) and a diode (D1), the diode being coupled to a source lead (3) having an a.c. potential, wherein the capacitor is charged to a substantially d.c. voltage (Vs);
   (iv) Zener diode means (21) for limiting Vs to a predetermined value;
   (v) voltage divider means (R3 and R5) for providing a predetermined reference signal;
   (vi) a silicon-controlled rectifier (SCR) (Q1) connected between the first output node (12) and the second output node (52);
   (vii) a hysteresis resistor (R4) connected in series between the reference voltage node (18) and the second output node (52), the resistor being of a value sufficient to prevent the flow of sufficient current to trigger the Triac when the SCR (Q1) is nonconducting;
   (viii) a temperature sensor in thermal contact with the water to be heated and which produces a temperature signal indicative of the temperature of the water; and
   (ix) comparator means coupled to the temperature sensor and to the reference node (18) for triggering the SCR when the temperature signal reaches a predetermined relationship with the reference signal;

wherein, upon triggering of the SCR, the hysteresis resistor alters the reference voltage such that the comparator maintains the SCR in conduction until the temperature signal reaches a second predetermined relationship with the reference voltage and wherein, the current drawn through the SCR causes a current to induce a swing in the gate potential of the Triac, thus triggering the Triac, which allows current to flow through a heater for heating the water and, substantially simultaneously, effectively short-circuits the input nodes of the diode bridge means (DB1), thereby detriggering the SCR, and reducing current flow through the diode bridge means.

6. A water heating system according to claim 5 and further comprising:
   (b) a substrate for supporting at least some of the circuit components of (a) and having an elongated probe portion for supporting the temperature sensor of (a) (viii) at a distance from the first region;
   (c) a stainless steel tube surrounding the probe portion;
   (d) resilient damping means surrounding the probe portion and surrounding the sensor for increasing the fundamental resonant frequency of the probe portion;
   (e) bracket means in thermal contact with the stainless steel tube of (c) for supporting the Triac of (a) (ii) for conducting heat away from the Triac and into the stainless steel tube for dissipation therefrom; and
   (f) exactly two mounting posts connecting the first region of the substrate of (b) with the bracket of (e), the mounting posts being located equidistant from the end of the stainless steel tube of (c).

* * * * *